Patented June 11, 1946

2,401,850

UNITED STATES PATENT OFFICE 2,401,850

PREPARATION OF FLUOROHYDROCARBONS

Gerald M. Whitman, Claymont, Del., assignor to E. I. du Pont de Nemours & Company, Wilmington, Del., a corporation of Delaware No Drawing. Application November 1, 1944, Serial No. 561,500

6 Claims. (Cl. 260—653)

This invention relates to the preparation of fluorohydrocarbons and especially of vinyl fluorides.

Many catalysts consisting of compounds of many metals and metal oxides either alone or supported on suitable substrates are known to catalyze the reaction between acetylene and hydrogen fluoride to produce vinyl fluoride. Particularly useful compositions are those obtained by impregnating charcoal with a suspension of mercury oxide or by formation of the oxide in situ on the charcoal. In the copending application of Leroy Frank Salisbury, Ser. No. 508,243, filed October 29, 1943, highly useful charcoal-supported mercury compound catalysts are disclosed as employable in the synthesis of vinyl fluoride and fluoroprenes. In the copending application of Arthur Livingston Barney, Ser. No. 517,837, filed January 11, 1944, there are also described compositions comprising mercury oxide at least partially combined chemically with an oxide of nitrogen supported on an alkaline earth metal salt. Although these catalysts, and especially those described in the aforementioned applications of Salisbury and Barney are advantageously useful for their designed purposes, at times they are characterized by certain disadvantages. Thus, a large part of the total mercury present in the charcoal-supported catalysts may be lost as free mercury either during the catalyst preparation or during its operation, thus reducing its activity. These charcoal-supported mercury catalysts although initially very active in the fluoroprene and vinyl fluoride synthesis tend to become less active during use, for instance, in 12-16 hours they may frequently lose as much as 50% of their original activity.

It has been found that the above disadvantages may be overcome effectively through the employment as a catalyst of a composition comprising an oxide of mercury chemically associated with chromic oxide, i. e. $Cr_2O_3$.

Accordingly, this invention has as an object the provision of a method for obtaining fluorohydrocarbons which is not subject to the aforementioned disadvantages. A further object is the provision of a practicable process for obtaining compounds of the general formula $RCF=CH_2$ (wherein R is of the group consisting of hydrogen atoms and hydrocarbon radicals). A still further object is to provide a new and improved method for obtaining vinyl fluoride from acetylene and hydrogen fluoride. Still another object is to provide a new and improved method for preparing 2-fluorobutadiene-1,3 from monovinyl-acetylene and hydrogen fluoride. Additional objects will become apparent from an examination of the following description and claims.

These and other objects and advantages are accomplished according to the herein described invention which broadly comprises the process for obtaining a fluorohydrocarbon which comprises passing a mixture of hydrogen fluoride and a compound having a molecular weight of not more than 85 and the general formula $RC\equiv CH$, wherein R is of the group consisting of hydrogen atoms and hydrocarbon radicals in the vapor phase over a catalyst comprising an oxide of mercury chemically associated with chromic oxide, said gaseous mixture being passed over said catalyst under substantially anhydrous conditions at a temperature within the range of from 20° C. to 400° C.

One preferred embodiment of this invention comprises passing a mixture of hydrogen fluoride and acetylene, in which the mole ratio of hydrogen fluoride to acetylene is within the range of from 1.5/1 to 1/2, over a catalyst which comprises mercuric chromite in intimate association with a chromite of a metal which forms a hydrogenating oxide, the gaseous mixture being passed over said catalyst under substantially anhydrous conditions at a temperature within the range of from 75° C. to 250° C., at a space velocity within the range of from 50 to 500.

By the term "hydrogenating oxide" as used herein and in the appended claims is meant an oxide which is capable under proper conditions of serving as a catalyst for the addition of hydrogen to such unsaturated compounds as ketones or olefins, or is capable of inducing the hydrogenation of alcohols in the vapor phase in preference to dehydration.

By the term "space velocity," as employed herein and in the appended claims, is meant the rate at which the gaseous reactants pass through the catalyst and is defined as the number of volumes of gas, calculated at normal temperature and pressure, which traverse one volume of catalyst during one hour.

The following examples, in which proportions are in parts by weight unless otherwise specified, are given for illustrative purposes and are not intended to place any restrictions on the herein described invention.

*Example I*

A mixture of dry gases consisting of 100 parts of acetylene and 115 parts of hydrogen fluoride is passed at a space velocity of 150 over a zinc-mercury chromite catalyst, prepared as described hereinafter, in a jacketed converter maintained at 146° C. The exit gases are freed of hydrogen fluoride by passing them through granulated soda lime, then freed of moisture by passage through anhydrous calcium chloride, and finally conducted into a trap, cooled with solid carbon dioxide and acetone. From the liquid collected in the cold trap there is obtained upon fractional distillation vinyl fluoride boiling at −72° C. The 1,2-dibromo-1-fluoroethane prepared therefrom by bromination boils at 120–120.5° C., specific gravity, $\frac{17}{4}$ 2.2580; $N_D^{19.5°\,C.}$, 1.5019; per cent carbon, 11.76; per cent hydrogen, 1.6; per cent bromine, 76.32; per cent fluorine, 8.72.

The catalyst used in the above example is prepared as follows:

A solution of 72 parts of ammonium dichromate and 35 parts of 28% ammonium hydroxide in 250 parts of water is added at room temperature to an agitated solution containing 100 parts of zinc nitrate and 12 parts of mercuric chloride in 430 parts of water and 2 parts of 70% nitric acid. The mixture is neutralized with additional ammonium hydroxide, and the precipitate is allowed to settle. After several washings by decantation, the precipitate is dried, ignited at 400° C., and compressed into pellets.

*Example II*

A mixture consisting of 100 parts of acetylene and 131 parts of anhydrous hydrogen fluoride is passed at a space velocity of 170 over a zinc-mercury chromite catalyst, prepared as described hereinafter, contained in a jacketed cylindrical converter about which water at 84° C. is circulated. The exit gases are passed through granulated soda lime, then through anhydrous calcium chloride, and finally into a trap cooled with solid carbon dioxide and acetone. The total condensate in the trap is separated into its components by fractional distillation. The condensate contains in addition to about 3 parts of unchanged acetylene, 992 parts of vinyl fluoride boiling at about −72° C. and 5 parts of 1,1-difluoroethane boiling at about −26° C.

The catalyst used in the above example is prepared as follows:

A solution of 202 parts of ammonium dichromate and 98 parts of 28% ammonium hydroxide in 600 parts of water is added at room temperature to a stirred solution consisting of 227 parts of zinc nitrate and 130 parts of mercuric nitrate in 600 parts of water. Thereafter the pH of the mixture is adjusted to 7.2 with additional ammonium hydroxide and the precipitate allowed to settle. After several washes by decantation, the precipitated chromate is dried, ignited at 250° C. to the corresponding chromite, and processed into pellets.

*Example III*

A mixture of about 500 parts of acetylene and 1200 parts of gaseous anhydrous hydrogen fluoride is passed over a copper-manganese-mercury chromite catalyst, prepared as described hereinafter, and maintained at about 40° C., at a space velocity of about 250. The effluent gases are treated as in Example I and from the condensate, after separation of unreacted acetylene, there is obtained a mixture of vinyl fluoride and 1,1-difluoroethane in a mole ratio in excess of 1.

The catalyst used in the above example is prepared as follows:

A solution of 504 parts of ammonium dichromate and 243 parts of 28% ammonium hydroxide in 1600 parts of water is added at room temperature to an agitated solution consisting of 188 parts of cupric nitrate, 358 parts of manganese nitrate, and 325 parts of mercuric nitrate in 1600 parts of water. Thereafter the mixture is neutralized with ammonium hydroxide and the precipitate allowed to settle. After several washes by decantation, the precipitated chromate is dried, ignited at 250° C. to the corresponding chromite, and pelleted.

*Example IV*

A gaseous mixture consisting of about 100 parts of acetylene and 130 parts of anhydrous hydrogen fluoride is passed at a space velocity of 50 over an aluminum-cobalt-mercury chromite catalyst, prepared as described hereinafter, contained in a tubular converter heated at 350° C. The effluent gases are freed of hydrogen fluoride and moisture and are passed through a condensing system cooled with solid carbon dioxide and acetone. The condensate after fractional distillation yields in addition to unchanged acetylene mainly vinyl fluoride.

The above catalyst is prepared as follows:

A solution of 328 parts of ammonium dichromate and 159 parts of 28% ammonium hydroxide in 500 parts of water is added at room temperature to a stirred solution consisting of 32 parts of mercuric nitrate, 274 parts of aluminum sulfate, and 17 parts of cobaltic chloride in 500 cc. of water. Sufficient ammonium hydroxide is then added to adjust the pH of the mixture to about 6.8, the precipitate allowed to settle, filtered, washed several times with water, and dried. The precipitate is ignited for 3 hours at 350° C. while freely exposed to air. The chromite composition resulting from the ignition is briquetted and screened to 8–14 mesh.

*Example V*

Thirty-nine parts of acetylene and 28 parts of anhydrous hydrogen fluoride are passed simultaneously in the gaseous state at a space velocity of 500 over a nickel-mercury chromite catalyst, prepared as described hereinafter, contained in a tubular reactor maintained at 212° C. The effluent gases are treated as described in Example I and in addition to unchanged acetylene, there are obtained vinyl fluoride and 1,1-difluoroethane.

The above catalyst is prepared as follows:

A solution of 252 parts of ammonium dichromate and 122 parts of 28% ammonium hydroxide in 800 parts of water is added at 70° C. to an agitated solution of 91 parts of nickel nitrate and 487 parts of mercuric nitrate in 800 parts of water likewise maintained at 70° C. Thereafter the mixture is neutralized with additional ammonium hydroxide and the precipitate allowed to settle. After several washes by decantation the precipitate is dried, heated for 10 hours at 250° C., cooled and then pelleted.

*Example VI*

By operating in the manner described in Example I, using instead of the zinc-mercury chromite composition a catalyst prepared as described hereinafter, there is obtained a vinyl fluoride and 1,1-difluoroethane in yields of 78% and 2% respectively.

The catalyst used in the above example is prepared as follows:

Five hundred parts of powdered iron chromite is impregnated with a solution of 50 parts of freshly prepared mercuric nitrate dissolved in 150 cc. of water. The impregnated iron chromite is dried under 2 mm. of pressure and then pelleted.

The mercuric nitrate is obtained by dissolving 34 parts of mercuric oxide in 31 parts of 70% nitric acid and the iron chromite by the addition of a solution consisting of 756 parts of ammonium bichromate and 365 parts of 28% ammonium hydroxide in 2,500 parts of water to a solution of 968 parts of ferric nitrate in 2,500 parts of water. Thereafter, the mixture is neutralized with additional ammonium hydroxide and the precipitate allowed to settle. After several washes by decantation the precipitate is dried, and ignited at 400° C. for 12 hours.

While this invention has been illustrated with particular reference to the use as catalysts of zinc-mercury chromite, copper-manganese-mercury chromite, aluminum-cobalt-mercury chromite and nickel-mercury chromite, it is to be understood that appreciable effects are had from the employment as catalysts of any composition comprising substantial proportions of a composition consisting of an oxide of mercury chemically associated with chromic oxide, e. g. mercuric chromite. However, on account of the superior results had therewith, the use as catalyst of a mercury-modified composition comprising a multiple chromite of mercury and a metal which forms a hydrogenating oxide is preferred. Optimum results are obtained with compositions which comprise mercuric chromite chemically associated with a chromite of aluminum, thallium, tin, lead, bismuth, manganese, iron, nickel, cobalt or zinc. The invention contemplates the use of various combinations and mixtures of these chromites in widely varying proportions of the respective constituents.

The catalyst of this invention can be prepared by any of the known methods which will give a catalytically active substance. The methods described in the examples are generically applicable. In preparing the mixed chromite catalysts, for example, it is advisable to wash the mixed chromite thoroughly with water until a negative test for the chloride or sulfate ion is obtained and then to calcine.

The catalyst of this invention may be used in the massive state or may be supported on porous carriers such as certain alkali metal salts, carbon and the like.

In order to prevent chalking and disintegration of the catalyst in use and to facilitate the catalyst reactivation, it is beneficial to add small amounts of binder such as ammonium hydrogen phosphate, boric acid, graphite and the like.

Any compound having a molecular weight of not more than 85 and the general formula $RC \equiv CH$, wherein R is of the group consisting of hydrogen atoms and hydrocarbon radicals, may be reacted with hydrogen fluoride in accordance with the process of this invention. One group of compounds of the aforementioned general formula which are particularly well adapted for use in the process of this invention are compounds having a molecular weight of not more than 85 and the general formula $R'CH = R''C \equiv CH$, wherein R' and R'' are selected from the group consisting of hydrogen atoms and monovalent saturated hydrocarbon radicals. Included among examples of compounds having the formula $RC \equiv CH$ as hereinbefore defined are: acetylene, monovinylacetylene, methylacetylene, pentene-3-yne-1, hexene-3-yne-1, 3-methylbutene-3-yne-1, etc.

Th process of this invention is operable within the range of from 20° C. to 400° C. However, optimum results are had when said process is effected at a temperature within the range of from 75° C. to 250° C. The ratio of hydrogen fluoride to the compound having the general formula $RC \equiv CH$ as hereinbefore defined may be varied over a wide range such as for example 3.5/1 to 1/2. However, in order to provide compounds having the formula $RCF = CH_2$, wherein R is of the group consisting of hydrogen atoms and hydrocarbon radicals, it has been found that the mole ratio of hydrogen fluoride to compound $RC \equiv CH$ should be within the range of from about 1.5/1 to about 1/2 in order to obtain maximum yields.

The process of this invention is preferably operated at normal pressures, e. g., substantially atmospheric pressure, but superatmospheric pressures or subatmospheric pressures may be used if desired.

Space velocity may be varied over a wide range and is generally within the range of from 50 to 500 because under these conditions optimum conversions are obtained.

The process of this invention is particularly well adapted for the preparation of vinyl fluoride and 2-fluoro-butadiene-1,3. For instance, as set out in the examples, substantial yields of vinyl fluoride may be had by reacting a mixture of hydrogen fluoride and acetylene in accordance with the process of this invention. However, by properly correlating the conditions of catalyst concentration, temperature, hydrogen fluoride to acetylene mole ratio, space velocity, pressure, etc., said reaction may proceed in such a manner as to produce 1,1-difluoroethane in substantial yield. When the mole ratio of hydrogen fluoride to acetylene is about 1/1, the resultant fluorohydrocarbon product is substantially pure vinyl fluoride, whereas when the mole ratio of hydrogen fluoride to acetylene is about 3/1, the gases emitted from the reaction chamber contain substantial amounts of 1,1-difluoroethane.

The compounds $RCF = CH_2$, e. g., vinyl fluoride, produced in accordance with the herein described process, are useful in the production of plastics and synthetic rubber.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful.

1. The process for obtaining a fluorohydrocarbon which comprises passing a mixture of hydrogen fluoride and a hydrocarbon selected from the group consisting of acetylene and monovinylacetylene over a catalyst comprising mercuric chromite intimately associated with a chromite of a metal which forms a hydrogenating oxide, the gaseous mixture being passed over said catalyst under substantially anhydrous conditions at a temperature within the range of from 20° C. to 400° C.

2. The process for obtaining a fluorohydrocarbon which comprises passing a mixture of hydrogen fluoride and a hydrocarbon selected from the group consisting of acetylene and monovinylacetylene over a catalyst comprising mercuric chromite chemically associated with a chromite of a metal which forms a hydrogenating oxide, said mixture being passed in gaseous condition over said catalyst under substantially anhydrous conditions at a temperature within the range of from 75° C. to 250° C., the mole ratio of hydrogen fluoride to hydrocarbon being within the range of from 3.5/1 to about 1/2.

3. The process for obtaining vinyl fluoride which comprises passing a mixture of hydrogen fluoride and acetylene, in which the mole ratio of hydrogen fluoride to acetylene is about 1/1, over a catalyst comprising mercuric chromite chemically associated with a chromite of a metal which forms a hydrogenating oxide, the gaseous mixture being passed over said catalyst under substantially anhydrous conditions at a temperature within the range of from 75° C. to 250° C.

4. The process set forth in claim 3 wherein the catalyst is a zinc-mercury-chromite catalyst, and the gaseous mixture is passed thereover at a space velocity within the range of from 50 to 500.

5. The process for obtaining 2-fluorobutadiene-1,3 which comprises passing a mixture of hydrogen fluoride and monovinyl acetylene, in which the mole ratio of hydrogen fluoride to monovinyl acetylene is about 1/1, over a catalyst comprising mercuric chromite chemically associated with a chromite of a metal which forms a hydrogenating oxide, the gaseous mixture being passed over said catalyst under substantially anhydrous conditions at a temperature within the range of from 75° C. to 250° C.

6. The process set forth in claim 5 wherein the catalyst is a zinc-mercury-chromite catalyst and the gaseous mixture is passed thereover at a space velocity within the range of from 50 to 500.

GERALD M. WHITMAN.